Sept. 12, 1950  W. SAMPSON ET AL  2,521,751
REFRIGERATING PLANT
Filed Dec. 14, 1945  2 Sheets-Sheet 1

INVENTORS
WILLIAM SAMPSON and ROBERT LESLIE JAMES HAYDEN
BY E. Francis Wentworth Jr.
ATTORNEY.

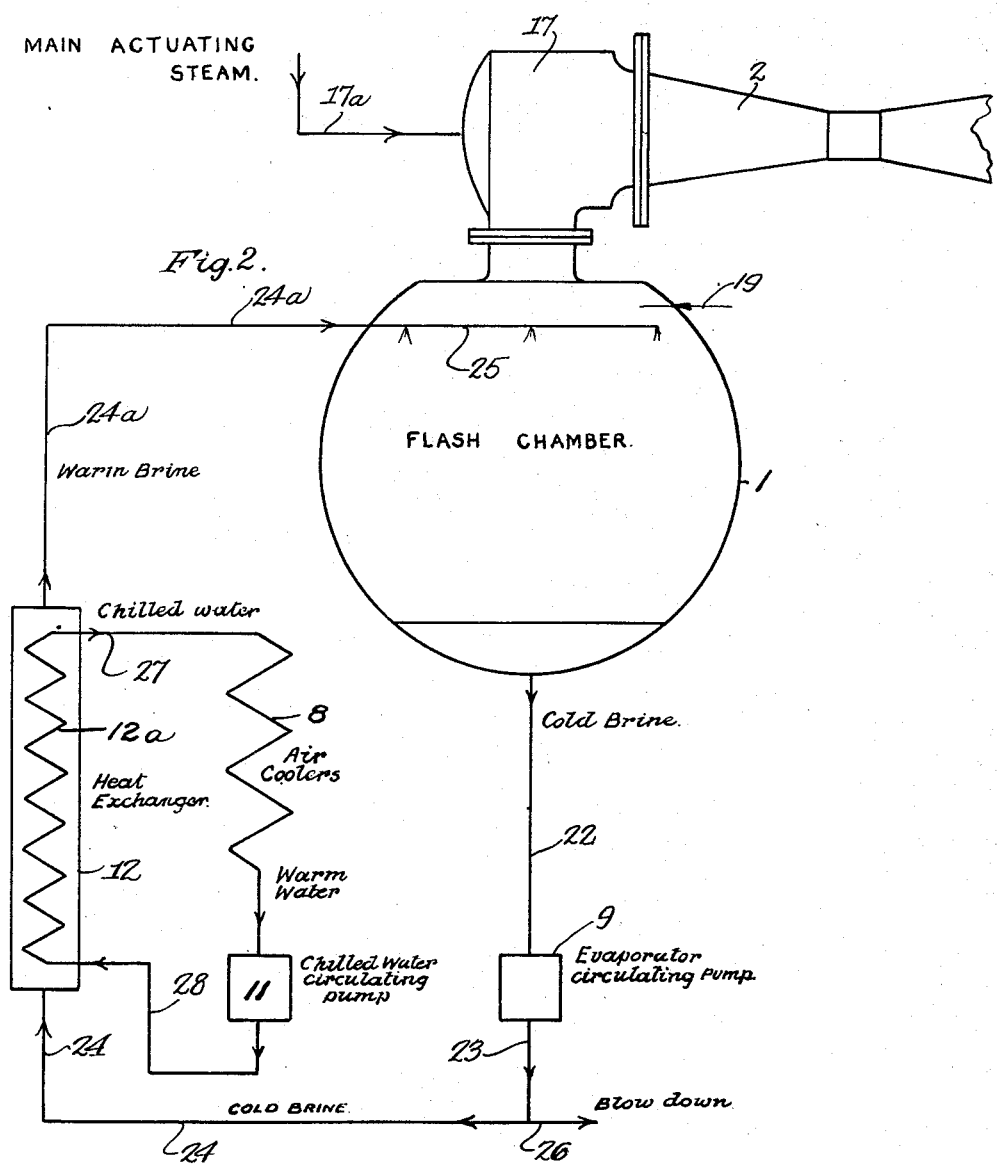

Patented Sept. 12, 1950

2,521,751

UNITED STATES PATENT OFFICE 2,521,751

REFRIGERATING PLANT

William Sampson and Robert Leslie James Hayden, Aldwych, London, England, assignors, by mesne assignments, to Foster Wheeler Corporation, New York, N. Y., a corporation of New York Application December 14, 1945, Serial No. 635,017
In Great Britain December 15, 1944

13 Claims. (Cl. 62—152)

1

The present invention relates to refrigerating plant of the steam jet vacuum type, particularly plant installed where evaporators usually are required to provide distilled water as on board ship, the object being to reduce the weight, space and steam consumption of the whole installation.

For this purpose, the refrigeration plant and the evaporators are combined so that the heat from the refrigeration load can be used to evaporate water or that the vapour generated in evaporating water can be used to operate the jets of the vacuum refrigeration plant.

Figure 1:
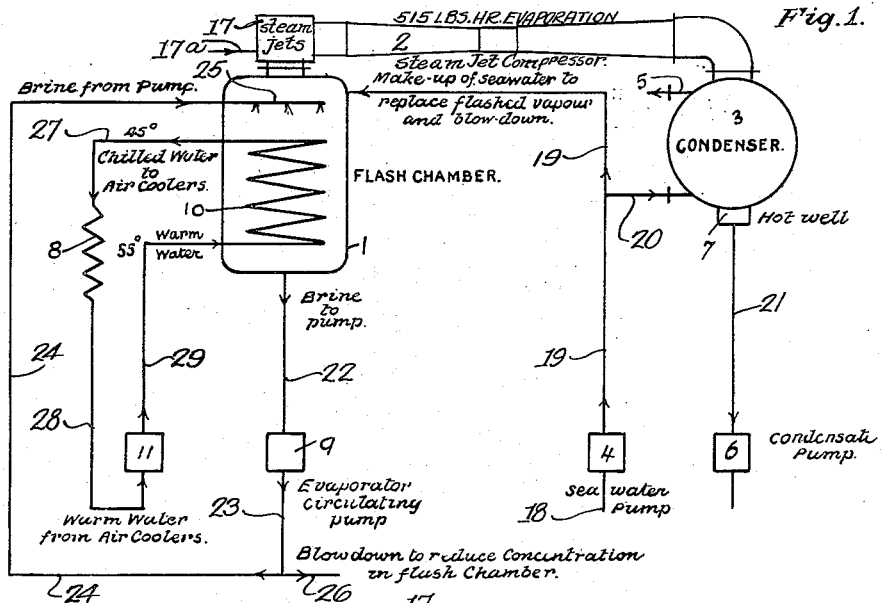
Figure 3:
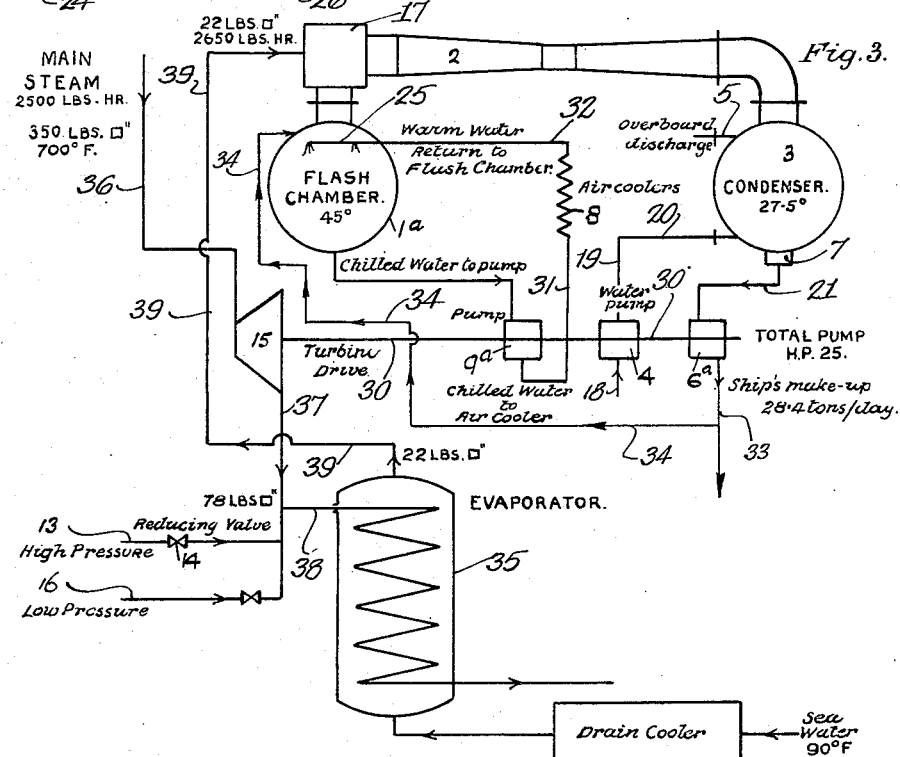

In the accompanying drawings three ways of carrying out the invention are diagrammatically illustrated, Fig. 1 being that of an arrangement in which a single vessel serves both as a flash chamber and as an evaporator. Fig. 2 represents a modification of part of Fig. 1. Fig. 3 is an arrangement in which separate vessels constitute the flash chamber and evaporator.

Referring first to Fig. 1, 1 represents a vessel constituting a flash chamber such as is used in well known vacuum refrigerating plants, with steam jets 17 mounted on the top thereof which steam jets receive steam through line 17a. The steam jets 17 are connected to the inlet end of a steam jet compressor 2 which compressor, at the suction or inlet end thereof, communicates with flash chamber 1 and at the discharge end thereof communicates with a surface condenser 3. A coolant for condensing steam entering condenser 3 from steam jet compressor 2 is supplied to said condenser by a sea water circulating pump 4 which receives sea water through line 18 and discharges said water through conduits 19 and 20 into the condensing surface of condenser 3. The sea water entering condenser 3 through lines 19 and 20, after passing it indirect heat exchange relationship with the steam in said condenser, flows outwardly thereof through discharge pipe 5. Condensate is withdrawn from hot well 7 through line 21 by a condensate extractor pump 6.

The refrigerating load, as shown in Figs. 1 to 3 of the drawings, comprises air coolers 8. A pump 9 draws brine from vessel 1 through a conduit 22 and discharges the brine through line 23 into a conduit 24 which brine passes in heat transfer relationship with the refrigerating load, air coolers 8, to sprays 25 in the upper part of vessel 1. Brine may be blown down, when desired, through line 26 which is in communication with line 23.

According to the present invention, the vessel

2

1 has a coil 10 therein through which water is circulated by a pump 11. The coil is connected at its discharge end to the inlet of air coolers 8 by a conduit 27. The outlet end of air coolers 8 is in communication with the suction of pump 11 through conduit 28 while the discharge of pump 11 is connected to one end of conduit 29, which conduit has the opposite end thereof connected to the inlet of coil 10.

In operation, flash chamber 1 is placed under a vacuum by action of steam jet compressor 2 actuated by steam jets 17. The steam from compressor 2 is condensed in condenser 3 by passing in indirect heat exchange relationship with sea water pumped through conduits 19 and 20 into the condensing surface of said condenser by pump 4 which water is discharged from the condensing surface through discharge pipe 5. Condensate is thereafter withdrawn from hot well 7 of condenser 3 through line 21 by pump 6.

A make-up of sea water is supplied to flash chamber 1 by pump 4 through conduit 19. Flashing will take place under the prevailing vacuum in flash chamber 1 thereby cooling the brine or sea water to the desired degree. The cooled brine is then pumped by pump 9 through conduit 22, line 23 thence into conduit 24. In conduit 24, the brine flows in indirect heat exchange relationship with air coolers 8, extracting heat therefrom, and thereafter into sprays 25. The brine thusly heated is sprayed into flash chamber 1 through sprays 25 and will be flashed, under the vacuum prevailing in flash chamber 1, the vapor being withdrawn from said chamber by steam jet compressor 2 while the brine, cooled by said flashing, passes downwardly into chamber 1.

Since coil 10 in flash chamber 1 is in heat exchange relationship with brine cooled in said chamber, water flowing through coil 10 is cooled by said brine. Water, which has been heated by passing through air coolers 8, is drawn from the outlet of the air coolers through conduit 28 by pump 11 and pumped into coil 10 through conduit 29. As the water circulates through coil 10, it is cooled by passing in indirect heat exchange relationship with the cooled brine in the flash chamber, the cooled water flowing outwardly of coil 10 through conduit 27 thence into air coolers 8. Cooling of water flowing through coil 10 thereby heats the water or brine in the flash chamber. The coil 10 in consequence acts as an evaporator of water in the vessel 1, the vapour being drawn off by the steam jet compressor. It will thus be apparent that heat from the refrigerator load is used to evaporate water in the flash chamber of a refrigerator plant without the use of steam and duplication of the condensing equipment and so many pumps as are required when an independent evaporator plant is employed.

The pump 4 in addition to supplying the condenser 3 supplies make up water to replace flashed vapour in the vessel 1 and blow down.

In the form of the invention shown in Fig. 2, water circulated through air coolers 8, instead of being passed through an evaporating coil in the flash chamber, is circulated through a heat exchanger 12. As shown, cooled brine withdrawn from chamber 1 through conduit 22 by pump 9 is passed into a heat exchanger 12 by said pump through line 23 and conduit 24. In the heat exchanger 12, the brine flows in indirect heat exchange relationship with a coil 12a into which water from air coolers 8 is pumped through conduit 28 by pump 11. The water flowing through coil 12a is cooled by passing in indirect heat exchange relationship with brine flowing into heat exchanger 12 through line 24. The cooled water passes from coil 12a through conduit 27 into air coolers 8 while the brine heated by said indirect heat exchange relationship in heat exchanger 12 flows into sprays 25 in flash chamber 1 through conduit 24a. The apparatus illustrated in Fig. 2 and the operation thereof is, in other respects, similar to that shown in Fig. 1 and hereinbefore described.

As will be obvious provision may be made for heat to be supplied to the water to be evaporated from a source other than the refrigerator circuit if evaporated water is required when refrigeration is not required.

In another arrangement, the vapour generated in evaporators is used for the operation of the steam jets of the jet compressor 2 serving to exhaust the flash chamber of the refrigerating plant.

Thus, as shown in Fig. 3, where 35 represents an ordinary evaporator, additional to a flash chamber 1a, steam for heating such evaporator may be taken from a high pressure line 13 through a suitable reducing valve 14 or from the exhaust of a steam turbine 15 or from any low pressure exhaust line 16 available or from two or all of these three sources. The turbine 15, in the example illustrated, receives steam through a main steam line 36 and discharges steam through lines 37 and 38 into evaporator 35. Steam from evaporator 35 is conducted to steam jets 17 through line 39.

As shown, turbine 15 is employed to drive a pump 9a through a shaft, shown diagrammatically at 30, to withdraw brine from flash chamber 1a through conduit 22 and pass the water to the inlet of air coolers 8 through line 31. After passing through air coolers 8 and becoming warmed, the brine is discharged through conduit 32 into sprays 25 in flash chamber 1a. Shaft 30 also drives pump 4, which passes sea water into condenser 3 through line 18 and conduits 19 and 20, and pump 6a, by means of which pump condensate is withdrawn from hot well 7 of condenser 3. The condensate withdrawn by pump 6a may be used as make-up water in flash chamber 1a by passing it from pump 6a through conduits 33 and 34 into the flash chamber.

In both Figs. 1 and 3 the temperatures indicated are assumed to be those obtainable for a 500,000 B. t. u. plant, the evaporation per day giving 5½ tons make-up.

It will be understood that changes may be made in the form, location and relative arrangement of the several parts of the refrigerating apparatus disclosed without departing from the principles of the invention. Consequently, the invention is not to be limited excepting by the scope of the appended claims.

What we claim is:

1. In refrigerating apparatus, means forming an evaporator chamber, conduit means associated with said chamber and through which a liquid is conducted thereto, vacuum creating means cooperating with said chamber for placing the chamber under vacuum and withdrawing vapor from liquid therein to effect cooling of the liquid by partial evaporation thereof, a heat exchanger, cooled liquid conduit means in communication with the evaporator chamber and with the heat exchanger so as to conduct cooled liquid from said chamber to the exchanger, a refrigerating load comprising means through which other liquid is passed, a liquid conducting line through which said other liquid is conducted to the heat exchanger after passing through said refrigerating load, another liquid conducting line communicating with said heat exchanger and said refrigerating load so as to conduct said other liquid from the heat exchanger to said refrigerating load after the other liquid has passed in heat transfer relationship with the cooled liquid in the heat exchanger, and return conduit means in communication with the heat exchanger and the evaporator chamber through which liquid warmed in the heat exchanger by passing in heat exchange relationship with said other liquid is passed from the heat exchanger to the evaporator chamber.

2. In refrigerating apparatus, means forming a flash chamber, conduit means associated with said chamber and through which a liquid is conducted thereto, vacuum creating means cooperating with said chamber for placing the chamber under vacuum and withdrawing vapor from liquid therein to effect cooling of the liquid by partial evaporation thereof, a heat exchanger, cooled liquid conducting means in communication with the flash chamber and with the heat exchanger so as to conduct cooled liquid from said chamber to the exchanger, a refrigerating load comprising means through which other liquid is passed, a liquid conducting line through which said other liquid is conducted to the heat exchanger after passing through said refrigerating load, another liquid conducting line communicating with said heat exchanger and said refrigerating load so as to conduct said other liquid from the heat exchanger to said refrigerating load after the other liquid has passed in heat transfer relationship with the cooled liquid in the heat exchanger, spray means in said flash chamber through which liquid is sprayed into said chamber, and return conduit means in communication with the heat exchanger and the spray means and through which liquid warmed in the heat exchanger by passing in heat exchange relationship with said other liquid is passed from the heat exchanger to the spray means.

3. In refrigerating apparatus, means forming an evaporator chamber, conduit means associated with said chamber and through which a liquid is conducted thereto, vacuum creating means cooperating with said chamber for placing the chamber under vacuum and withdrawing vapor from liquid therein to effect cooling of the liquid by partial evaporation thereof, a refrigerating load comprising means through which other liquid is passed, a coil in said chamber, a liquid conducting line in communication with said coil and said refrigerating load and through which other liquid is passed from said coil to the refrigerating load after being cooled in said chamber, another liquid conducting line communicating with said refrigerating load and the coil so as to conduct said other liquid from the refrigerating load to the coil after the other liquid has passed through the refrigerating load and has become warmed, means in communication with the evaporator chamber to receive cooled liquid therefrom after passage in heat exchange relation with the coil and pass said liquid in heat transfer relationship with the refrigerating load and extract heat therefrom thereby warming said liquid from the evaporator chamber, said last-mentioned means also being in communication with the evaporator chamber so that liquid warmed by heat exchange relationship with the refrigerating load is passed to said chamber.

4. In refrigerating apparatus, means forming an evaporator chamber, conduit means associated with said chamber and through which a liquid is conducted thereto, vacuum creating means cooperating with said chamber for placing the chamber under vacuum and withdrawing vapor from liquid therein to effect cooling of the liquid by partial evaporation thereof, a refrigerating load comprising means through which liquid is passed, a liquid conducting line in communication with the evaporator chamber and with the refrigerating load to receive cooled liquid from the chamber and pass it to said refrigerating load, and another liquid conducting line communicating with the refrigerating load and the evaporator chamber so as to conduct liquid from the refrigerating load to the evaporator chamber after the liquid has passed through the refrigerating load and has become warmed.

5. A method of refrigeration which comprises introducing liquid into an evaporation zone, placing said zone under such vacuum as to partially vaporize the liquid and effect a cooling thereof, removing the vapor from said evaporation zone, circulating other liquid through a refrigerating load zone, passing said other liquid from the refrigerating load zone in indirect heat exchange relationship with cooled liquid from the evaporation zone in a heat exchange zone, flowing said other liquid cooled in the heat exchange zone to the refrigerating load zone, and flowing said liquid from the evaporation zone after warming thereof by said heat exchange in the heat exchange zone to the evaporation zone for introduction thereinto.

6. A method of refrigeration which comprises introducing liquid into an evaporation zone, placing said zone under such vacuum as to partially vaporize the liquid and effect a cooling thereof, removing the vapor from said evaporation zone, circulating other liquid through a heat exchange zone within said evaporation zone and in indirect heat exchange relationship with liquid in the evaporation zone to cool said other liquid, passing the cooled other liquid through a refrigerating load zone to extract heat from a medium to be cooled, flowing the other liquid containing said extracted heat into said heat exchange zone, passing said liquid cooled in the evaporation zone in indirect heat exchange relationship with the other liquid flowing through said refrigerating load zone thereby cooling said zone and warming said cooled liquid from the evaporation zone by heat extracted from said refrigerating zone, and flowing the warmed liquid to the evaporation zone for introduction thereinto.

7. A method of refrigeration which comprises introducing liquid into an evaporation zone, placing said zone under such vacuum as to partially vaporize the liquid and effect a cooling thereof, removing the vapor from said evaporation zone, circulating other liquid through a heat exchange zone within said evaporation zone and in indirect heat exchange relationship with liquid in the evaporation zone to cool said other liquid, passing the cooled other liquid through a refrigerating load zone to extract heat from a medium to be cooled, flowing the other liquid containing said extracted heat into said heat exchange zone, passing said liquid cooled in the evaporation zone in indirect heat exchange relationship with the other liquid flowing through said refrigerating load zone thereby cooling said zone and warming said cooled liquid from the evaporation zone by heat extracted from said refrigerating zone, and spraying the warmed liquid to the evaporation zone for introduction thereinto.

8. In refrigerating apparatus, means forming an evaporator chamber, conduit means associated with said chamber and through which a liquid is conducted thereto, a steam jet, a steam jet compressor operated by said steam jet, said steam jet compressor being in communication with the evaporator chamber to place the chamber under vacuum and withdraw vapor from the liquid therein to effect cooling by partial evaporation of said liquid, a heat exchanger, cooled liquid conduit means in communication with the evaporator chamber and with the heat exchanger so as to conduct cooled liquid from said chamber to the exchanger, a refrigerating load comprising means through which other liquid is passed, a liquid conducting line through which said other liquid is conducted to the heat exchanger after passing through said refrigerating load, another liquid conducting line communicating with said heat exchanger and said refrigerating load so as to conduct said other liquid from the heat exchanger to said refrigerating load after the other liquid has passed in heat transfer relationship with the cooled liquid in the heat exchanger, and return conduit means in communication with the heat exchanger and the evaporator chamber through which liquid warmed in the heat exchanger by passing in heat exchange relationship with said other liquid is passed from the heat exchanger to the evaporator chamber.

9. In refrigerating apparatus, means forming a flash chamber, conduit means associated with said chamber and through which a liquid is conducted thereto, a steam jet, a steam jet compressor operated by said steam jet, said steam jet compressor being in communication with the flash chamber to place the chamber under vacuum and withdraw vapor from the liquid therein to effect cooling by partial evaporation of said liquid, a heat exchanger, cooled liquid conducting means in communication with the flash chamber and with the heat exchanger so as to conduct cooled liquid from said chamber to the exchanger, a refrigerating load comprising means through which other liquid is passed, a liquid conducting line through which said other liquid is conducted to the heat exchanger after passing through said refrigerating load, another liquid conducting line communicating with said heat exchanger and said refrigerating load so as to conduct said other liquid from the heat exchanger to said refrigerating load after the other liquid has passed in heat transfer relationship with the cooled liquid in the heat exchanger, spray means in said flash chamber through which liquid is sprayed into said chamber, and return conduit means in communication with the heat exchanger and the spray means and through which liquid warmed in the heat exchanger by passing in heat exchange relationship with said other liquid is passed from the heat exchanger to the spray means.

10. In refrigerating apparatus, means forming an evaporator chamber, conduit means associated with said chamber and through which a liquid is conducted thereto, vacuum creating means cooperating with said chamber for placing the chamber under vacuum and withdrawing vapor from liquid therein to effect cooling of the liquid by partial evaporation thereof, a refrigerating load comprising means through which other liquid is circulated, and liquid conducting means in heat exchange relationship with the other liquid circulating through the refrigerating load, said liquid conducting means having an inlet in communication with the evaporator chamber to receive cooled liquid therefrom and an outlet in communication with the evaporator chamber to discharge liquid thereinto after passage in heat exchange relationship with said other liquid circulating through the refrigerating load.

11. A method of refrigeration which comprises introducing liquid into an evaporation zone, placing said zone under such vacuum as to vaporize liquid therein and effect a cooling thereof, removing the vapor from said evaporation zone, circulating other liquid through a refrigerating load zone, passing said other liquid from the refrigerating load zone in indirect heat exchange relationship with cooled liquid from the evaporation zone in a heat exchange zone, flowing said other liquid cooled in the heat exchange zone to the refrigerating load zone, and flowing said liquid from the evaporation zone after warming thereof by said heat exchange in the heat exchange zone to the evaporation zone for introduction thereinto.

12. A method of refrigeration which comprises introducing liquid into an evaporation zone, placing said zone under such vacuum as to vaporize liquid therein and effect a cooling thereof, removing the vapor from said evaporation zone, circulating other liquid through a refrigerating load zone, passing said other liquid from the refrigerating load zone in indirect heat exchange relationship with cooled liquid from the evaporation zone in a heat exchange zone, flowing said other liquid cooled in the heat exchange zone to the refrigerating load zone, and spraying the warmed liquid from the heat exchange zone into the evaporation zone for introduction of said liquid thereinto.

13. A method of refrigeration which comprises introducing liquid into an evaporation zone, placing said zone under such vacuum as to vaporize liquid therein and effect a cooling thereof, removing the vapor from said evaporation zone, circulating other liquid through a refrigerating load zone, withdrawing cooled liquid from the evaporation zone, passing said other liquid circulating through the refrigerating load zone and the cooled liquid from the evaporation zone in indirect heat exchange relationship with one another, and returning said liquid from the evaporation zone to said evaporation zone for introduction thereinto after passage thereof in indirect heat exchange relationship with the other liquid circulating through the refrigerating load zone.

WILLIAM SAMPSON.
ROBERT LESLIE JAMES HAYDEN.

REFERENCES CITED

The following references are of record in the file of this patent:

UNITED STATES PATENTS

| Number | Name | Date |
|---|---|---|
| 874,986 | Parsons | Dec. 31, 1907 |
| 1,993,288 | Smith et al. | Mar. 5, 1935 |
| 2,172,408 | Randel | Sept. 12, 1939 |
| 2,206,428 | Reavis | July 2, 1940 |

FOREIGN PATENTS

| Number | Country | Date |
|---|---|---|
| 9,541 | Germany | Apr. 17, 1880 |
| 551,223 | France | Mar. 30, 1923 |